Patented July 16, 1935

2,008,242

UNITED STATES PATENT OFFICE 2,008,242

MANUFACTURE OF POROUS EBONITE DIAPHRAGMS FOR ELECTRIC BATTERIES AND OTHER PURPOSES

Sydney James Clark, New Malden, England, assignor to The Young Accumulator Company (1929) Limited, New Malden, England, a British company No Drawing. Application October 29, 1934, Serial No. 750,608. In Great Britain October 31, 1933

8 Claims. (Cl. 18—53)

The present invention relates to a method of producing articles, such as diaphragms or spacers for electric batteries, of moulded porous ebonite.

It is the primary object of the invention to produce such articles having a multiplicity of uniform interstices between the particles of moulded ebonite.

A further object of the invention is to produce a diaphragm or spacer of moulded ebonite which is free from local dense patches which during charge, by retarding the diffusion of strong concentrations of acid created in the plate, causes high temperature in use and local action.

Another object is to produce a diaphragm or spacer which does not contain any uncombined rubber which would render the diaphragm or spacer liable to be attacked by the oxidizing action of the peroxide or nascent oxygen formed at the positive electrodes of a secondary cell.

These and other objects of the invention will appear from the following description.

According to a preferred method, a rubber mixture is made with a sulphur content such that complete vulcanization produces a soft rubber. This vulcanization is so judged as to produce a soft rubber which can be crumbled, for example, by means of a rolling mill or like cracking machine; and care must be taken that the vulcanization is not pushed so far as to be over-vulcanized. The sheets of rubber, after full vulcanization, are passed through the rolls of a grinding-mill or through a cracking-machine until a fine crumb or powder results. This crumb, or powder, is mixed with an aqueous mixture of water or other suitable liquid containing a wetting medium, such as that sold under the registered trade mark "Igepon" and known as Igepon T. or other material, in which is a dispersion of sulphur, or colloidal sulphur of sufficient quantity to bring the whole mixture to a sulphur content of say 32% which, after vulcanization, will produce a complete ebonite which is not attacked by peroxide or nascent oxygen at the positive electrodes of the secondary cell. The powders can either all be mixed dry or some or all mixed with water. The moisture content is so adjusted that the material will flow easily into a mould either as by pouring, rolling, extrusion or by centrifugal means.

Each rubber particle of this mixture is thus surrounded by an aqueous dispersion of sulphur or colloidal sulphur. As water is (to all intents and purposes) incompressible, slight variations in pressure of the moulds do not compress the interstices between the rubber particles, but force the particles to take up new positions, thus keeping a uniform pore volume throughout the mass.

After filling the moulds and pressing them together their contents can be vulcanized by subjecting the moulds to heat, for example, open steam, heated platens between which the moulds are passed, or in air. The vulcanization is preferably carried out in open steam because of the increased speed of vulcanization this method has over the other two methods. During this vulcanization the sulphur in the aqueous dispersion of sulphur surrounding the rubber particles combines with the rubber particles and knits them together at a multiplicity of points, leaving between the particles a multiplicity of uniform interstices by reason of the evaporation of the water content.

What I claim is:—

1. A method for the purpose specified, consisting in fully vulcanizing a mixture of rubber and sulphur, comminuting said fully vulcanized mixture, mixing said comminuted fully vulcanized mixture with an aqueous solution containing sulphur, moulding the resulting mixture under pressure, and heating said moulded product in its mould, said heating producing further vulcanization of the product, whereby the particles of the comminuted mixture are knitted together by the sulphur of the aqueous solution, whilst the water of the aqueous solution is evaporated during this further vulcanization so as to form interstices between the particles.

2. A method according to claim 1, wherein the aqueous solution contains a dispersion of sulphur.

3. A method according to claim 1, wherein the aqueous solution contains colloidal sulphur.

4. A method according to claim 1, wherein the initial vulcanization is carried out to completion to produce a fully vulcanized soft rubber.

5. A method according to claim 1, wherein the rubber and sulphur mixture is fully vulcanized into sheets, said fully vulcanized sheets being comminuted as by being passed between rolls of a rolling mill or like means.

6. A method according to claim 1, wherein the quantity of sulphur contained in the aqueous solution is such that after final vulcanization the whole mixture is in a state of about 32% combined sulphur vulcanite.

7. A method according to claim 1, wherein the comminuted fully vulcanized mixture is mixed with the aqueous solution to form an easily flowing mixture.

8. A method according to claim 1, wherein the final vulcanization is effected by open steam heating.

SYDNEY JAMES CLARK.

CERTIFICATE OF CORRECTION.

Patent No. 2,008,242.                                                              July 16, 1935.

SYDNEY JAMES CLARK.

It is hereby certified that the above numbered patent was erroneously issued to "The Young Accumulator Company (1929) Limited", as assignee of the entire interest in said invention, whereas said patent should have been issued to the inventor, Sydney James Clark and The Young Accumulator Company (1929) Limited, of New Malden, England, a British Company, said company being assignee of one-half interest only in said invention, as shown by the records of this office; and that the said Letters Patent should be read with this correction therein that the same may conform to the record of the case in the Patent Office.

Signed and sealed this 29th day of September, A. D. 1936.

Henry Van Arsdale

(Seal)                                                  Acting Commissioner of Patents.